Patented Aug. 31, 1954

2,687,952

UNITED STATES PATENT OFFICE 2,687,952

CYCLIC PROCESS FOR PRODUCING HIGH GRADE SYNTHETIC MANGANESE ORES BY OXIDATION OF MOLTEN IRON-MANGANESE ALLOYS

Russell C. Buehl and Miles B. Royer, Pittsburgh, Pa., assignors to the United States of America as represented by the Solicitor of the Department of Interior No Drawing. Application July 1, 1952,
Serial No. 296,768

10 Claims. (Cl. 75—24)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to a pyro-metallurgical process for production of a slag product containing a high content of a selected metal oxide from low grade metalliferous material containing other metals and less desirable elements, and more particularly to a process for production of a slag high in manganese-oxide content from low grade manganese containing material such as steel plant slags, manganiferous iron ores, spiegeleisen, and similar raw materials containing manganese, iron, and phosphorus.

Low grade or waste materials containing valuable metals, such as manganese, chromium, and vanadium, exist in this country and elsewhere in great abundance, and in the absence of readily available sources of high-grade ores the recovery of these metals in utilizable form from the low grade materials is a matter of considerable economic importance. For example, the average analysis of open hearth slags produced in this country shows 8 per cent manganese, 20 per cent iron, and 2.5 per cent phosphorus pentoxide. Manganiferous iron ores may carry a higher percentage of manganese but also are generally too high in iron and phosphorus content for production of ferro-manganese alloys suitable for the steel industry. Smelting these materials with carbon, as in a blast furnace process, produces a metal alloy containing a higher proportion of the manganese or other desired metal than the raw material, but this alloy also contains an undesirably high content of iron and impurities such as phosphorus.

Accordingly, an object of this invention is to provide a process for the production of a slag containing a high-content of a selected metal oxide from low-grade metalliferous materials containing other metals and less desirable elements.

Another object of this invention is to provide a process for producing a high-grade manganese product from low-grade manganese-containing materials.

A further object of this invention is to provide a process for the production of a low-phosphorus manganese product suitable for use in the steel industry, from open hearth slag, manganiferous iron ore and similar raw materials.

A still further object of this invention is to provide a process for treatment of an iron-manganese alloy containing phosphorus to produce a slag high in manganese content but low in iron and phosphorus.

An additional object of this invention is to provide a process for production of low-phosphorus manganese slag by the oxidation of an iron-manganese alloy containing phosphorus.

These objects are accomplished in accordance with this invention by first producing a metal alloy from the low-grade raw material or by obtaining a metal alloy from any convenient source, selectively oxidizing the alloy in liquid form to separate substantially all of the desired metal in the form of a slag from the remaining metals, and purifying the separated metal oxide slag from undesirable oxides by contacting it with material containing the desired metal in higher proportion than the metal bath from which the slag was separated.

In operating the process to recover a manganese slag, the open hearth slag, manganiferous iron ore, or other manganese-bearing raw material is fed into a blast furnace, electric furnace, or similar apparatus, together with coke and limestone or dolomite. In the furnace operation, iron, phosphorus, and manganese are reduced to elemental form and are withdrawn as a metal alloy known as "spiegeleisen." This alloy, for example, may contain about 12–24 per cent manganese, 2–4 per cent phosphorus, 4 per cent carbon, 1–5 per cent silicon and the remainder essentially iron.

The molten alloy is then poured into a suitable apparatus for the oxidation step. A converter having a steel shell lined with refractory and provided with one or more inlets through which a gas may be blown into the molten metal may be used for this purpose. A converter having a basic lining is preferred for recovery of manganese from spiegeleisen.

An oxidizing gas, such as air, oxygen, steam, or any combination of these agents, is now blown through the inlets in the converter and the converter is tilted so that the gas blows through the metal. The oxygen in the gas oxidizes the silicon and manganese in the metal bath and also some of the iron, phosphorus and carbon. Since manganese oxidizes more readily than iron and phosphorus, a partial oxidation of the metal alloy results in a slag high in manganese oxide content together with a metal containing most of the iron and phosphorus. The amount of iron and phosphorus oxidized and appearing in the slag depends on the extent to which manganese is oxidized from the bath. The oxidized metals float on top of the metal bath in the form of a slag.

By discontinuing the blowing operation at a time at which the metal bath still contains a relatively high proportion of unoxidized manganese, for example 8 to 10 per cent, a manganese slag may be obtained of relatively high purity with respect to iron and phosphorus content. In accordance with one embodiment of this invention, manganese slag may be drawn off at this point and blowing is then continued on the metal bath to oxidize the remaining manganese. Alternatively, the blowing operation is continued without an intermediate slag separation. In either operation the oxidization is continued until the manganese content of the metal remaining in the bath has been sufficiently lowered to warrant its discharge from the process without loss of an appreciable amount of manganese. This may be in the order of one per cent Mn and preferably is less than about three per cent. The molten metal, low in manganese content, is then run out of the converter leaving a manganese slag undesirably high in iron and phosphorus.

The purification of the manganese slag is accomplished by introducing into the molten slag additional material having a higher content of metallic manganese than the molten metal previously removed from the impure manganese slag. The additional material, conveniently, may be another portion of spiegeleisen from the blast furnace. The elements in the new spiegel that are more readily oxidizable than iron and phosphorus, such as manganese, carbon, and silicon, reduce the iron and phosphorus oxides from manganese slag. The fluidity of the bath is increased by the presence of silica in the slag which may come entirely from oxidation of silicon in the metal or can be obtained by additions of sand. Alumina likewise when present in small amounts may be desirable for this purpose. Slags with silica contents above 20 per cent are quite fluid at the operating temperature of a converter and, therefore, easy to handle, but such high concentration of silica is undesirable for the subsequent production of ferromanganese from the high-manganese slags.

In order to secure intimate contact of the reducing material with the slag, the material in the converter may be agitated in any convenient manner as by blowing it with a non-oxidizing gas, such as nitrogen, or with limited amounts of oxidizing gases, such as air. By agitating the slag with the new batch of metal by blowing it with gases in the converter the reduction of the slag occurs very rapidly. Agitation for a period of about five minutes is usually adequate when a five-hundred-pound batch of metal is employed as the additive reducing material. The converter is now tilted and the purified slag product is run off the top. If an intermediate slag product is produced, as described above, the final slag product may suitably be combined with the intermediate product for use in the steel industry.

The molten metal material remaining in the converter after the purifying step is now used as the material for repeating the process. This material is blown with the oxidizing gas to produce manganese slag, the metal is drawn off, the manganese slag is purified by adding a new batch of manganese material and the process is repeated in cyclic manner with continuous production of high-manganese slag as long as desired.

Heat may be supplied to the material at any stage of the process if necessary to keep it in liquid form. The treating gases may be preheated, if desired, and a separate source of heat may be provided. For example, the converter may be equipped with electrical heating means, or heat may be supplied by combustion above the slag and metal.

The purification procedure when operated in this manner requires no special equipment not otherwise used in the process, consumes no raw materials which would not otherwise be used, and adds no objectionable oxides to the slag that would not be present in any event. By use of the process of this invention, it is possible to produce, by the partial oxidation of manganese from spiegeleisen containing about 12 to 24 per cent manganese and 4 per cent phosphorus, a slag product containing about 60 per cent manganese, an Mn to Fe ratio of at least 15, and a phosphorus content of about 0.17 per cent or less. The manganese content of the metal discarded or diverted to steel production is around one to two per cent or may be even lower if desired, so loss of manganese in this metal is small. The process, therefore, permits the production of a high-grade manganese product with a high-manganese recovery from the waste or raw material.

The invention is further illustrated but is not intended to be limited by the following examples of practice.

Example 1

Liquid spiegeleisen from a blast furnace containing 17.4 per cent Mn, 0.6 per cent Si, 3.6 per cent P, and 3.9 per cent C is poured into a basic lined converter. The converter is tilted and a controlled amount of air is blown through the tuyères until only ½ to 3 per cent manganese remains in the metal. A slag consisting of the oxidized metals floats on top. The converter is then tilted so that the tuyères are above the bath and the blow is stopped. The metal is run out of the converter leaving the slag in the converter, which contains about 60 per cent manganese, 9 per cent iron, and 0.5 to 1 per cent phosphorus. A new batch of molten spiegeleisen of approximately the same composition as the original material is poured into the slag in the converter. Air or an inert gas is blown through the tuyères, the converter is tilted and the metal given a short blow to agitate the metal and slag in order to facilitate reduction of the iron and phosphorus in the slag. The converter is then tilted so the tuyères are above the metal and slag and the flow of gas or air is stopped. In this operation the iron in the slag is reduced from 9 per cent to 3.5 per cent, and the phosphorus is reduced from 0.5 to 1 per cent down to 0.1 per cent, the manganese content remaining substantially constant at around 60 per cent. Slag is run or raked off the top of the metal in the converter and recovered as the high manganese-content product, leaving the blown metal in the converter. Air is now introduced again into the tuyères, the converter tilted and the metal is blown until the manganese content is low, that is, ½ to 3 per cent as in the preceding batch. The process cycle including the purifying step is then repeated.

Example 2

Liquid spiegeleisen containing 23.5 per cent Mn, 2.1 per cent Si, 4.1 per cent P, 2.7 per cent C and the balance Fe was poured into a basic converter. Air was introduced into the metal in the converter until a major portion of the manganese was oxidized and appeared in the slag floating on top of the metal, but the air flow was stopped before all of the manganese was oxidized and before any substantial amounts of iron and phosphorus appeared in the slag. A slag of suitable purity containing 62 per cent Mn, 3.8 per cent iron, 0.18 per cent phosphorus, and 14.4 per cent $SiO_2$ was run off the top of the converter at this point in the process. The remaining metal which contained 6.6 per cent Mn, 5.2 per cent P, 1.0 per cent C and 0.0 per cent Si was now blown by again introducing air into the converter. A slag formed containing 9.0 per cent Fe, 59 per cent Mn, and 0.74 per cent P. The metal which contained 2.6 per cent Mn, 5.3 per cent P, and 0.3 per cent C was now withdrawn from the converter leaving the slag.

Another batch of spiegeleisen which in this instance contained 27.1 per cent Mn, 2.3 per cent Si, 3.9 per cent P and 2.6 per cent C was added to the converter. Air was introduced to agitate the mass. The resulting purified slag contained 60.8 per cent Mn, 3.4 per cent Fe, 0.16 per cent P, and 16 per cent $SiO_2$. This slag was run off and combined with the first batch of high Mn content slag and stock-piled for production of ferro-manganese. The metal remaining in the converter contained 12.8 per cent Mn, 0.0 per cent Si, 4.9 per cent P and 1.4 per cent C, and was again blown to a suitable low manganese content, and then discarded to a high phosphorus-iron stock-pile. The manganese oxide slag was again purified by treatment with another batch of spiegeleisen and the process cycle repeated.

While the process has been described in connection with the selective oxidation of manganese from an alloy containing iron and phosphorus, and subsequent reduction of the iron and phosphorus content of the manganese oxide slag, it is readily apparent that the process also has utility in recovery of manganese from any mixture or alloys containing metals less readily oxidizable than manganese. Likewise, the process may be applied to the separation of other oxidizable metals from mixtures or alloys of less readily oxidizable materials. For example, a high chrome oxide relatively low in iron may be made by oxidation of a chrome-iron alloy and purification of the oxides by reduction of the impurities as described herein. Vanadium oxides may be recovered in similar manner from alloys with iron. It is evident that the process can equally well be applied to the separation of many metals from alloys however obtained by oxidation of an alloying element and reduction of the resulting slag by the addition of a second-metal charge. Either acidic or basic lined furnaces or other apparatus may be employed for carrying out the process depending on the nature of the materials treated.

It will be apparent from a reading of the foregoing specification that the invention herein described is susceptible of various changes and modifications without departing from the spirit and scope thereof.

What is claimed is:

1. A cyclic process for production of a slag with a high content of a selected element from a molten metal containing this element along with other elements, comprising oxidizing the selected element to form a slag, containing also an oxide of an undesired element, separating the remaining molten metal, reducing undesired oxides in said slag by contacting it with another charge of said first-mentioned molten metal, removing the purified slag, and repeating the process with the remaining metal.

2. A process for production of high-manganese slag low in iron and phosphorus from phosphorus-containing spiegeleisen comprising introducing the spiegeleisen in liquid form into a basic lined converter; blowing the liquid spiegeleisen in the converter with air until a high-manganese slag is formed and less than about 3 per cent of manganese remains in the metal, withdrawing the metal from the converter, introducing another batch of liquid spiegeleisen into the converter, agitating the high-manganese slag in the converter with the newly added spiegeleisen by again blowing the molten material with a gas until the ratio of manganese to iron in the manganese slag is about 15 and the phosphorus content of the manganese slag is less than 0.17 per cent, withdrawing the thus purified high-manganese slag, and repeating the process in a cyclic manner with the spiegeleisen remaining in the converter.

3. A process for production of high-manganese slag low in iron and phosphorus from phosphorus-containing spiegeleisen comprising introducing a charge of said spiegeleisen in liquid form into a basic-lined converter, blowing the liquid spiegeleisen with air, stopping the blow before the manganese content of the metal has decreased to 4 per cent, removing the high-manganese low-phosphorus slag, blowing the metal further until the manganese content is below 3 per cent, discharging the metal but retaining the slag, adding a second charge of liquid spiegeleisen, blowing said charge, stopping the blow before the manganese in the metal has decreased to 4 per cent, removing the high-manganese low-phosphorus slag, and repeating the process in a cyclic manner.

4. A process for the production of a manganese oxide concentrate from a molten alloy of iron and manganese containing also phosphorus and silicon which comprises subjecting such an alloy to liquid-phase partial oxidation with an oxygen-containing gas until the manganese content of the alloy appears as an oxidized slag on the surface of the liquid metal residue, said manganese-containing oxidized slag having also a substantial content of oxidized phosphorus, iron and silicon, then separating the oxidized slag from the manganese-depleted remaining metal by-product, intimately admixing the manganese oxide-containing slag with a fresh portion of said molten alloy prior to said partial oxidation, whereby oxidized phosphorus and iron are returned to the alloy, and some manganese is oxidized into the slag, removing and recovering a manganese oxide concentrate as a phosphorus-depleted slag, and conducting a further partial oxidation upon the molten alloy as before.

5. The process of claim 4 in which the molten alloy is spiegeleisen.

6. The process of claim 4 in which the oxygen-containing gas is air.

7. The process of claim 4 in which the intimate admixing, of the manganese oxide-containing slag with the fresh portion of the molten alloy, is accomplished by blowing with an inert gas.

8. The process of claim 4 in which the partial oxidation with the oxygen-containing gas is repeated upon the remaining metal by-product to yield an additional portion of manganese oxide-containing slag for return to the molten alloy prior to oxidation with the oxygen-containing gas.

9. A process for the production of a manganese oxide concentrate from an alloy of iron and manganese which comprises subjecting such an alloy to liquid-phase partial oxidation in the presence of slag-forming constituents including silicon whereby a substantial proportion of metallic manganese and some iron are oxidized and pass together with some iron oxides, into the slag, separating the slag from the molten metal, then returning the high-manganese slag with its iron oxides into contact with a fresh portion of manganese-iron alloy as before to reduce and separate a substantial portion of the iron content of the slag in the metallic form, and recovering an iron-depleted, manganese oxide product as a slag.

10. A process for recovering a selected element from a molten alloy containing said element and at least one other element comprising partially oxidizing the molten alloy to form a slag containing an oxide of the selected element and an oxide of said other undesired element, removing said latter oxide from the slag by contacting the slag with another charge of said molten alloy, thereby reducing the oxide of the undesired element and oxidizing the selected element and recovering the slag enriched in the selected element and depleted in the undesired element.

References Cited in the file of this patent

UNITED STATES PATENTS

| Number | Name | Date |
|---|---|---|
| 1,979,753 | Lose et al. | Nov. 6, 1934 |
| 2,127,074 | Udy | Aug. 16, 1938 |
| 2,458,469 | Greffe | Jan. 4, 1949 |

OTHER REFERENCES

"Metallurgy of Iron and Steel," 3rd edition by Bradley Stoughton (1923), pages 103, 104, 106, 109.